United States Patent
Atarius et al.

(10) Patent No.: US 8,787,362 B2
(45) Date of Patent: Jul. 22, 2014

(54) FALL BACK USING MOBILE DEVICE ASSISTED TERMINATING ACCESS DOMAIN SELECTION

(75) Inventors: Roozbeh Atarius, San Diego, CA (US); Arungundram C. Mahendran, San Diego, CA (US); Haipeng Jin, Carlsbad, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 12/732,806

(22) Filed: Mar. 26, 2010

(65) Prior Publication Data

US 2010/0303012 A1    Dec. 2, 2010

Related U.S. Application Data

(60) Provisional application No. 61/165,717, filed on Apr. 1, 2009.

(51) Int. Cl.
*H04L 12/66* (2006.01)
*H04L 29/06* (2006.01)
*H04W 76/02* (2009.01)

(52) U.S. Cl.
CPC ......... *H04L 65/1069* (2013.01); *H04L 65/1096* (2013.01); *H04L 65/1016* (2013.01); *H04W 76/027* (2013.01)
USPC ........... 370/355; 370/328; 370/352; 370/353; 370/354

(58) Field of Classification Search
None
See application file for complete search history.

(56) References Cited

U.S. PATENT DOCUMENTS

| 5,392,328 | A | * | 2/1995 | Schmidt et al. | 379/27.06 |
| 5,604,737 | A | * | 2/1997 | Iwami et al. | 370/352 |
| 6,349,209 | B1 | * | 2/2002 | Foladare et al. | 455/445 |

(Continued)

FOREIGN PATENT DOCUMENTS

| CN | 101400122 | A | * | 4/2009 |
| CN | 101472340 | A | * | 7/2009 |

(Continued)

OTHER PUBLICATIONS

3rd Generation Partnership Project; Technical Specification Group Services and Architecture; IP Multimedia Subsystem (IMS) Service Continuity; Stage 2 (Release 9) SGPP Standard; SGPP TS 23.237, 3RD Generation Partnership Project (SGPP), Mobile Competence Centre ; 650, Route Des Lucioles ; F-06921 Sophia-Antipolis Cedex ; France, No. V9.0.0, Mar. 1, 2009, pp. 1-41, XP050363377 the whole document.

(Continued)

*Primary Examiner* — Ian N Moore
*Assistant Examiner* — Dung B Huynh
(74) *Attorney, Agent, or Firm* — François A. Pelaez

(57) ABSTRACT

Fall back using mobile device assisted terminating access domain selection is provided. A network entity forwards an invitation to a session to a mobile device. Session has packet switched bearers for media. Mobile device replies with a rejection of the invitation and a request for network entity to hold the session. Rejection is based on mobile device determining circuit switched bearers should be utilized. Mobile device sends a circuit switched call and network entity correlates the circuit switched call with the session. A dialog is set up over circuit switched domain bearers and Internet Protocol Multimedia Subsystem bearers.

39 Claims, 11 Drawing Sheets

(56) References Cited

U.S. PATENT DOCUMENTS

| | | | |
|---|---|---|---|
| 6,370,239 B1* | 4/2002 | Le et al. | 379/100.09 |
| 6,515,964 B1* | 2/2003 | Cheung et al. | 370/230 |
| 6,701,439 B1* | 3/2004 | Dunn | 380/255 |
| 6,993,355 B1* | 1/2006 | Pershan | 455/518 |
| 7,142,560 B2* | 11/2006 | Mansfield | 370/466 |
| 7,301,938 B2* | 11/2007 | Ejzak | 370/352 |
| 7,305,070 B2* | 12/2007 | Kortum et al. | 379/88.18 |
| 7,362,853 B2* | 4/2008 | Halkosaari | 379/114.12 |
| 7,668,305 B2* | 2/2010 | Akizuki et al. | 379/211.01 |
| 8,081,748 B2* | 12/2011 | Johns | 379/211.01 |
| 8,102,841 B2* | 1/2012 | Elumalai et al. | 370/353 |
| 8,208,442 B2* | 6/2012 | Mahdi et al. | 370/331 |
| 2003/0156701 A1* | 8/2003 | Burg et al. | 379/215.01 |
| 2004/0229614 A1* | 11/2004 | Kim et al. | 455/435.1 |
| 2005/0286496 A1* | 12/2005 | Malhotra et al. | 370/352 |
| 2005/0286498 A1* | 12/2005 | Rand et al. | 370/352 |
| 2006/0067302 A1* | 3/2006 | Wengrovitz et al. | 370/352 |
| 2006/0077943 A1* | 4/2006 | Liu et al. | 370/338 |
| 2006/0176874 A1* | 8/2006 | Shaffer et al. | 370/352 |
| 2006/0268900 A1 | 11/2006 | Larsson et al. | |
| 2007/0113086 A1* | 5/2007 | Huang et al. | 713/168 |
| 2007/0121584 A1 | 5/2007 | Qiu et al. | |
| 2007/0157022 A1* | 7/2007 | Blom et al. | 713/166 |
| 2008/0020789 A1* | 1/2008 | Yan et al. | 455/466 |
| 2008/0032695 A1* | 2/2008 | Zhu et al. | 455/442 |
| 2008/0049724 A1* | 2/2008 | Tsujino et al. | 370/352 |
| 2008/0102784 A1* | 5/2008 | Mittal et al. | 455/404.1 |
| 2008/0117893 A1* | 5/2008 | Witzel et al. | 370/352 |
| 2008/0151870 A1* | 6/2008 | Stucker et al. | 370/352 |
| 2008/0205381 A1* | 8/2008 | Zhu et al. | 370/352 |
| 2008/0285543 A1* | 11/2008 | Qiu et al. | 370/352 |
| 2008/0298353 A1* | 12/2008 | Zhu et al. | 370/356 |
| 2008/0310397 A1* | 12/2008 | Hu et al. | 370/352 |
| 2009/0003276 A1 | 1/2009 | Mutikainen et al. | |
| 2009/0016330 A1* | 1/2009 | Witzel et al. | 370/352 |
| 2009/0052438 A1* | 2/2009 | Zhu et al. | 370/352 |
| 2009/0137234 A1* | 5/2009 | An et al. | 455/416 |
| 2009/0153490 A1* | 6/2009 | Nymark et al. | 345/169 |
| 2009/0213839 A1* | 8/2009 | Davis et al. | 370/352 |
| 2010/0061331 A1* | 3/2010 | Guo et al. | 370/329 |
| 2010/0064038 A1* | 3/2010 | Hu | 709/223 |
| 2010/0103927 A1* | 4/2010 | Bakker | 370/352 |
| 2010/0118790 A1* | 5/2010 | Guo et al. | 370/328 |
| 2010/0220689 A1* | 9/2010 | Hu et al. | 370/331 |
| 2010/0227621 A1* | 9/2010 | Wu | 455/450 |
| 2011/0013623 A1* | 1/2011 | Hu et al. | 370/355 |
| 2011/0029668 A1* | 2/2011 | Menai | 709/224 |
| 2011/0090845 A1* | 4/2011 | Bishop et al. | 370/328 |
| 2011/0090848 A1* | 4/2011 | Kim et al. | 370/328 |
| 2011/0310742 A1* | 12/2011 | Liu et al. | 370/235.1 |
| 2011/0310884 A1* | 12/2011 | Arauz-Rosado | 370/352 |
| 2012/0040671 A1* | 2/2012 | Guo et al. | 455/435.1 |
| 2012/0120789 A1* | 5/2012 | Ramachandran et al. | 370/220 |
| 2012/0142349 A1* | 6/2012 | Guo et al. | 455/435.1 |
| 2012/0182912 A1* | 7/2012 | Watfa et al. | 370/311 |
| 2012/0213140 A1* | 8/2012 | Olsson et al. | 370/311 |
| 2012/0246255 A1* | 9/2012 | Walker et al. | 709/208 |

FOREIGN PATENT DOCUMENTS

| | | | |
|---|---|---|---|
| CN | 101552980 A | * | 10/2009 |
| CN | 101562854 A | * | 10/2009 |
| CN | 101572943 A | * | 11/2009 |
| JP | 2009517933 A | | 4/2009 |
| JP | 2009524342 A | | 6/2009 |
| RU | 2317647 C2 | | 2/2008 |
| RU | 2007107353 A | | 9/2008 |
| WO | WO-2004110092 A1 | | 12/2004 |
| WO | WO-2006010526 A1 | | 2/2006 |
| WO | 2007083979 A1 | | 7/2007 |
| WO | WO-2007123370 A1 | | 11/2007 |
| WO | 2008117966 A1 | | 10/2008 |
| WO | WO 2009152760 A1 | * | 12/2009 |
| WO | WO 2011107041 A2 | * | 9/2011 |

OTHER PUBLICATIONS

3rd Generation Partnership Project; Technical Specification Group Services and System Aspects; Circuit Switched Fallback in Evolved Packet System; Stage 2 (Release 8) SGPP Standard; SGPP TS 23.272, SRD Generation Partnership Project (SGPP), Mobile Competence Centre; 650, Route Des Lucioles; F-06921 Sophia-Antipolis Cedex; France, No. V8.3.0, Mar. 1, 2009, pp. 1-47, XP050363519 the whole document.

International Search Report and Written Opinion—PCT/US2010/029692, International Search Authority—European Patent Office—Jul. 28, 2010.

Vodafone: "Terminating voice call handling in networks supporting SAE ISR and/or Release R"gg ISR SGPP Draft; S2-086727 SRVCC MT Call Handling, SRD Generation Partnership Project (SGPP), Mobile Competence Centre 650, Route Des Lucioles ; F-06921 Sophia-Antipolis Cedex ; France, no. China; 20081007, Oct. 7, 2008, XP050331339 [retrieved on Oct. 7, 2008] the whole document.

Vodafone: "Terminating voice call handling in SRVCC networks supporting EPS ISR" SGPP Draft; S2-086728 CR 23216-810 SRVCC MT Call Handling, SRD Generation Partnership Project (SGPP), Mobile Competence Centre ; 650, Route Des Lucioles ; F-06921 Sophia-Antipolis Cedex ; France, No. China; 20081007, Oct. 7, 2008, XP050331340 [retrieved on Oct. 7, 2008] the whole document.

* cited by examiner

US 8,787,362 B2

FALL BACK USING MOBILE DEVICE ASSISTED TERMINATING ACCESS DOMAIN SELECTION

CROSS-REFERENCE

This is an application claiming priority to Provisional Application No. 61/165,717 entitled "FALLBACK USING UE ASSISTED T-ADS" filed Apr. 1, 2009, and assigned to the assignee hereof and hereby expressly incorporated by reference herein.

BACKGROUND

I. Field

The following description relates generally to wireless communications and more particularly to fall back procedures in a wireless communication environment.

II. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile devices. Each mobile device can communicate with one or more base stations through transmissions on forward and reverse links. The forward link (or downlink) refers to the communication link from base stations to mobile devices. The reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

Communication systems, such as circuit switched (CS) systems and packet switched (PS) systems, have been developed. CS systems were developed as part of the Global System of Mobile Communication (GSM). PS systems can operate on the basis of Internet Protocol (IP), such as a Universal Mobile Telecommunications Standard (UMTS) or an Internet Protocol Multimedia Subsystem (IMS). There has been a change from CS systems to PS systems and other systems due to the need to convey different types of payload data or media, such as voice, audio, images, executable program code, text data, and other forms of payload data.

In some geographic areas, CS systems and PS systems can exist in parallel and mobile device users within the geographic area desire adequate coverage, regardless of the system supported by the user's mobile device. However, an IMS system is unable to determine if the terminating CS network is available if the Single Radio Voice Call Continuity (SRVCC) network supports Idle mode Signaling Reduction (ISR). Therefore, terminating calls may be sent to the PS domain even though the terminating calls should be sent to the CS domain, which can lead to dropped calls and other problems that can result in negative user experiences.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with fall back using mobile device assisted terminating access domain selection. According to an aspect is a method for fall back procedures in a communications environment. Method comprises forwarding to a first mobile device an invitation for a session. Invitation is from a second mobile device and has packet switched bearers for media. Method also includes holding session as a function of a rejection to invitation by first mobile device, receiving a circuit switched call from first mobile device, and correlating circuit switched call with session. Method further includes establishing a communication between first mobile device and second mobile device over circuit switched domain bearers and Internet Protocol Multimedia Subsystem (IMS) bearers.

Another aspect relates to a wireless communications apparatus comprising a memory and a processor. Memory retains instructions related to sending to a first node an invitation for a session received by a second node and receiving from first node a rejection of session and a request to hold session. Memory retains further instructions related to detecting a circuit switched call from first node, mapping circuit switched call to session, and setting up a dialog between first node and second node over circuit switched domain bearers and Internet Protocol Multimedia Subsystem (IMS) bearers. Processor is coupled to memory and is configured to execute instructions retained in memory.

An aspect relates to a wireless communications apparatus that performs fall back procedures. Wireless communications apparatus comprises means for forwarding to a first mobile device an invitation for a session and means for receiving a rejection to invitation. Invitation is from a second mobile device and has packet switched bearers for media. Wireless communications apparatus also includes means for temporarily holding session as a function of rejection to invitation by first mobile device and means for obtaining a circuit switched call from first mobile device. Also included are means for mapping circuit switched call to session and means for establishing a communication between first mobile device and second mobile device.

In accordance with some aspects, means for receiving further comprising means for receiving an error message that comprises an Idle mode Signaling Reduction indication in a header or a body of error message. According to some aspects, means for receiving further comprising means for receiving an indication of an Idle mode Signaling Reduction from a feature tag. In accordance with some aspects, means for mapping further comprising means for determining there is a match between an Internet Protocol Multimedia Private Identity of session and circuit switched call.

Another aspect relates to a computer program product comprising a computer-readable medium. Included in computer-readable medium is a first set of codes for causing a computer to forward an initial INVITE towards a first node over a Gm reference point using packet switched media. Also included is a second set of codes for causing computer to create a first Session Initiation Protocol (SIP INVITE) request with a Protocol Specific Identification of Destination Network (PSI DN) in a Session Description Protocol (SDP) body. Computer-readable medium also includes a third set of codes for causing computer to route the SIP INVITE to first node and a fourth set of codes for causing computer to receive from first node an error SIP response that indicates a network relies on Idle mode Signaling Reduction (ISR). Also included is a fifth set of codes for causing computer to hold a session associated with initial INVITE. Computer-readable medium also includes a sixth set of codes for causing computer to fetch an Internet Protocol Multimedia Private Identity (IMPI) associated to a GRUU (Globally Routable User Agent URIs) inserted in a contact header of a SIP response and a seventh set of codes for causing computer to receive a second SIP INVITE request from a CS domain. Further, computer-readable medium includes an eighth set of codes for causing computer to fetch IMPI associated with SIP INVITE and a ninth set of codes for causing computer to establish session toward a second node if IMPI associated with first SIP INVITE matches IMPI associated with second SIP INVITE.

An aspect relates to at least one processor configured to perform call termination as a fall back over circuit switched domain. Processor includes a first module that sends to a first node an invitation for a session received by a second node and a second module that receives a rejection of session and a request to hold session. Also included in processor is a third module that detects a circuit switched call from first node, a fourth module that maps circuit switched call to session, and a fifth module that sets up a dialog between first node and second node over circuit switched domain bearers and Internet Protocol Multimedia Subsystem (IMS) bearers.

An aspect relates to a method for fall back using mobile device assisted terminating access domain selection. Method includes receiving an invitation for a session with packet switched bearers for media, rejecting invitation, and establishing a circuit switched call toward a network entity. Method also includes terminating an incoming communication that is a correlation of session and circuit switched call.

Another aspect relates to a wireless communications apparatus that comprises a memory and a processor. Memory retains instructions related to receiving a Session Initiation Protocol (SIP) INVITE request, deciding to use circuit switched origination, terminating a call using an Internet Protocol bearer, sending an error SIP response to the SIP INVITE, and sending a circuit switched call SETUP message. Processor is coupled to memory and is configured to execute instructions retained in memory.

An aspect relates to a wireless communications apparatus that utilizes fall back procedures. Wireless communications apparatus includes means for receiving an invitation to a session, means for rejecting invitation, and means for requesting a network entity hold session. Invitation is sent by a mobile device and comprises packet switched bearers for media. Wireless communications apparatus also includes means for establishing a circuit switched call to network entity and means for communicating with mobile device over session and circuit switched call.

In accordance with some aspects, means for rejecting further comprising means for transmitting an error message to network entity. According to some aspects, means for rejecting further comprising means for transmitting an error message that includes an Idle mode Signaling Reduction indicator in a header or a body of error message. According to an aspect, means for rejecting further comprising means for determining a current network relies on Idle mode Signaling Reduction (ISR).

Another aspect relates to a computer program product comprising a computer-readable medium. Included in computer-readable medium is a first set of codes for causing a computer to receive an invitation for a session with packet switched bearers for media and a second set of codes for causing computer to reject invitation. Computer-readable medium also includes a third set of codes for causing computer to establish a circuit switched call toward a network entity and a fourth set of codes for causing computer to process a communication that is a correlation of session and circuit switched call.

An aspect relates to at least one processor configured to facilitate fall back procedures. Processor includes a first module that receives an invitation to a session, a second module that rejects invitation, and a third module that requests a network entity hold session. Invitation is sent by a mobile device and comprises packet switched bearers for media. Processor also includes a fourth module that establishes a circuit switched call to network entity and a fifth module that communicates with mobile device over session and circuit switched call.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
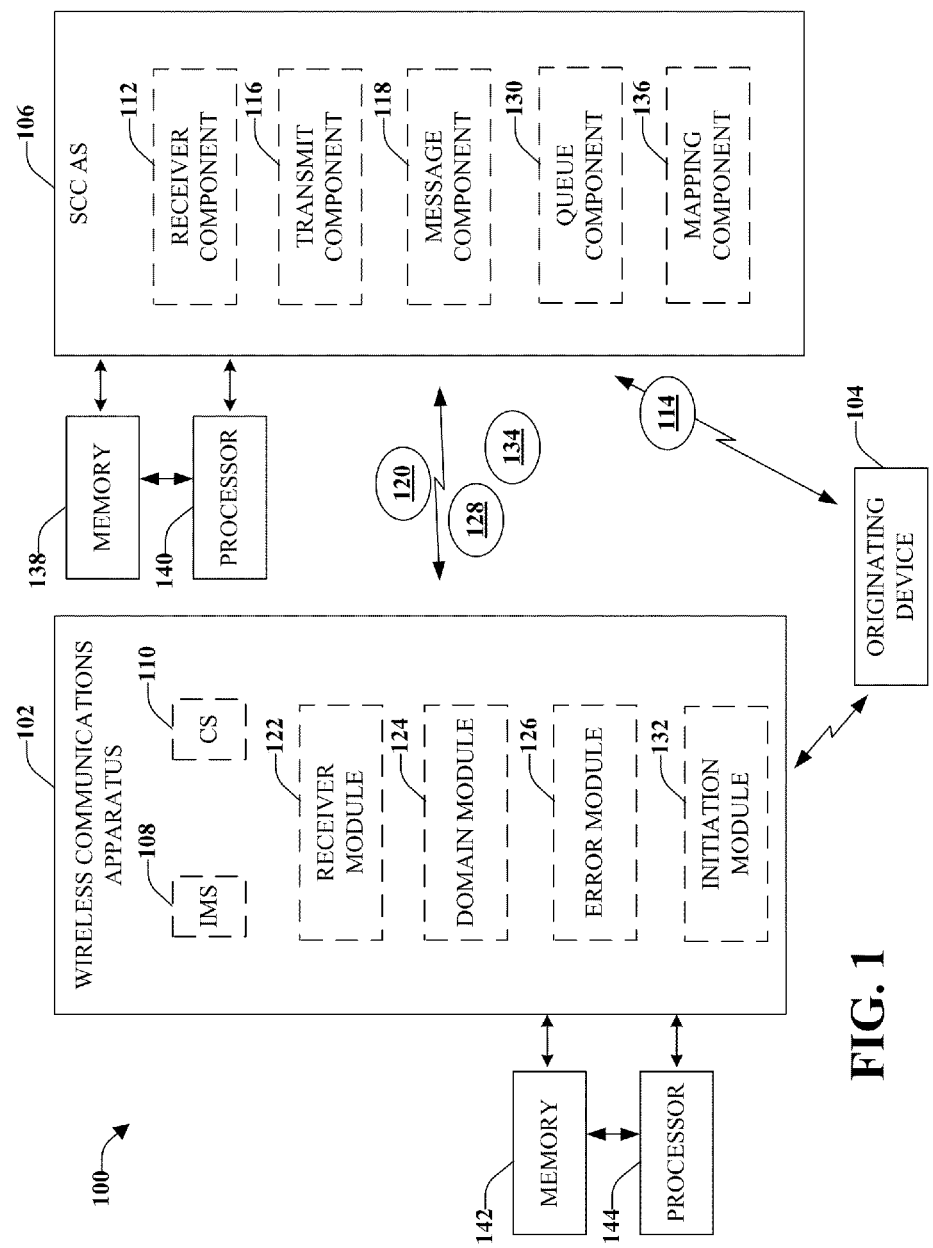
FIG. 1 illustrates a system that is configured for fall back using mobile device assisted terminating access domain selection, according to an aspect.

With reference to FIG. 1, illustrated is a system 100 that is configured for fall back using mobile device assisted terminating access domain selection, according to an aspect. System 100 includes a wireless communication apparatus 102 that is configured to communicate with other wireless communications apparatus and/or network entities. For purposes of explanation, wireless communications apparatus 102 is illustrated as communicating with an originating device 104 (which can be a wireless communications apparatus or mobile device) and a Service Centralization and Continuity Application Server (SCC AS 106).

Wireless communications apparatus 102 can be configured to support both Internet Protocol Multimedia Subsystem (IMS 108) and Circuit-Switched (CS 110). For example, a signaling portion of a communication can be processed with IMS 108 and the media portion of the communication can be processed with CS 110. There might be situations when network (e.g., SCC AS 106) is not aware of how to route signaling to wireless communications apparatus 102 or how to instruct wireless communications apparatus 102 that this is an incoming communication. The disclosed aspects can overcome the situation of network not understanding how to route communications.

SCC AS 106 (which is serving wireless communications apparatus 102) receives (at a receiver component 112) an INVITE 114 from originating device 104. INVITE 114 is a communication intended for wireless communications apparatus 102. INVITE 114 can be a Session Initiation Protocol (SIP) INVITE. SCC AS 106 (transmit component 116) forwards INVITE 114 towards wireless communications apparatus 102. Transmit component 116 can forward INVITE 114 utilizing Packet Switched (PS) bearers for the media (since SCC AS 106 cannot determine that a CS domain should be utilized). In accordance with some aspects, to forward INVITE 114, a message component 118 creates a SIP INVITE request with the SCC AS Protocol Specific Identification of Destination Network (PSI DN) in the Session Description Protocol (SDP) body and routes the created SIP INVITE 120 towards wireless communications apparatus 102 (e.g., terminating device).

At substantially the same time as receiving SIP INVITE 120 (at a receiver module 122), a domain module 124 makes a determination whether to use IMS 108 or CS 110. For example, the determination can be made based on whether Idle mode Signaling Reduction (ISR) is active and/or whether various Single Radio Voice Call Continuity (SRVCC) procedures are used. If the determination by domain module 124 is that CS 110 origination should be used, an error module 126 configures and sends an error message 128 to SCC AS 106. In accordance with some aspects, error message includes an SDP answer or a SIP header indicating the current network relies on ISR. Error message 128 can also include an indication for SCC AS 106 to hold the session associated with INVITE 114 (previously, the call would have been dropped).

After error message 128 is received (at receiver component 112) a queue component 130 holds, at least temporarily, the session associated with the INVITE 114.

An initiation component 132 is configured to initiate a circuit switched call (CS call 134) in response to SIP INVITE 120. CS call 134 can include a called party Binary Coded Decimal (BCD) number information element. To establish CS call 134, wireless communications apparatus 102 can obtain from SCC AS 106 a BCD number (or other number) of originating device 104 and include the BCD number in the CS call 134.

CS call 134 is translated to IMS session while reaching SCC AS 106. A mapping component 136 is configured to correlate the CS call with original INVITE 114 (or held session). According to some aspects, mapping component 136 ascertains that the node for which incoming communication (INVITE 114) was intended and the node that established the CS call 134 is the same node (e.g., wireless communications apparatus 102) based on identifiers in INVITE 114 and CS call 134. In accordance with some aspects, to perform the correlation, mapping component 136 obtains an IMPI (Internet Protocol Multimedia Private Identity) associated with the Globally Routable User Agent URIs (GRUU) inserted in the error message 128. Mapping component 136 might also obtain ISR information from registered feature tags. If CS call 134 is successfully mapped to the initial INVITE 114, a dialog between wireless communications apparatus 102 and originating device 104 is established.

A memory 138 can be operatively coupled to SCC AS 106. Memory 138 can be external or internal to SCC AS 106. Memory 138 can store instructions related to sending to a first node an invitation for a session received by a second node and receiving from first node a rejection of session and a request to hold session. Memory 138 can also retain instructions related to detecting a circuit switched call from first node, mapping circuit switched call to session, and setting up a dialog between first node and second node over circuit switched domain bearers and Internet Protocol Multimedia Subsystem (IMS) bearers.

In accordance with some aspects, memory 138 retains further instructions related to translating circuit switched call to an Internet Protocol Multimedia Subsystem session before the correlating. According to some aspects, memory 138 retains further instructions related to holding session as a function of an error message received from first node. Error message comprises an Idle mode Signaling Reduction indication Idle mode signaling Reduction indication can be included in a body or a header of error message.

According to some aspects, memory 138 retains further instructions related to holding the session based on an Idle mode Signaling Reduction indication received in a feature tag. According to another aspect, memory 138 retains further instructions related to determining there is a match between an Internet Protocol Multimedia Private Identity of the session and the circuit switched call.

At least one processor 140 can be operatively connected to SCC AS 106 (and/or memory 138) to facilitate analysis of information related to fall back procedures in a communication network. In accordance with some aspects, processor 140 is configured to perform call termination as a fall back over circuit switched domain. Processor 140 can include a first module that sends to a first node an invitation for a session received by a second node and a second module that receives a rejection of session and a request to hold the session. Processor 140 also includes a third module that detects a circuit switched call from first node and a fourth module that maps circuit switched call to session. Also included in processor 140 is a fifth module that sets up a dialog between first node and second node over circuit switched domain bearers and Internet Protocol Multimedia Subsystem (IMS) bearers. In accordance with some aspects, second module receives rejection that includes an error message that comprises an Idle mode Signaling Reduction indication in a header or a body of the error message.

In accordance with some aspects, the following describes SCC AS behavior for call termination as fall back over CS. When SCC AS (e.g., SCC AS 106), serving the terminating ICS mobile device (e.g., wireless communications apparatus 102), forwards the initiating INVITE (e.g., INVITE 114) towards terminating mobile device over a Gm reference point using only PS media (because the SCC AS is unable to accurately determine that CS domain should be used (e.g., when ISR (as per TS 24.301) is active and if SRVCC procedures (as per TS 23.216) are used)). SCC AS shall act as a Back-To-Back User Agent (B2BUA), the SCC AS shall create a SIP INVITE request in accordance with 3GPP TS 24.229[11] with the SCC AS PSI DN in the SDP body and route the created SIP INVITE request (e.g., SIP INVITE 120) towards terminating mobile device.

Upon receipt of an error SIP response (e.g., error message 128) to the SIP INVITE request, including an SDP answer or a SIP header indicating the current network relies on ISR, the SCC AS shall hold the session (e.g., queue component 130) associated to the initial SIP INVITE. SCC AS (e.g., mapping component 136) shall fetch the IMPI associated to the GRUU inserted in the Contact header of the SIP response. The SCC AS may also obtain the ISR information from the registered feature tags by mobile device.

When SCC AS receives a SIP INVITE request from the CS domain (e.g., CS call 134), SCC AS shall check that the Request URI (Universal Resource Identifier) is set to a valid SCC AS PSI DN. If the value of P-Asserted-ID is generated by mobile device C-MSISDN, SCC AS shall fetch the associated IMPI from Home Subscriber Server (HSS) via Sh reference point. If SCC AS holds a SIP session associated for the same IMPI, SCC AS shall proceed by establishing that hold session towards the originating mobile device.

With continuing reference to FIG. 1, a memory 142 can be operatively coupled (internal or external) to wireless communications apparatus 102. Memory 142 can store instructions related to receiving a Session Initiation Protocol (SIP) INVITE request, and deciding to use circuit switched origination. Memory 142 retains further instructions related to terminating a call using an Internet Protocol bearer, sending an error SIP response to the SIP INVITE, and sending a circuit call SETUP message.

In accordance with some aspects, memory 142 retains further instructions related to populating CC SETUP message with a called party Binary Coded Decimal (BCD) number element set to a Protocol Specific Identification of Destination Network (PSI DN) received in a Session Description Protocol (SDP) body of SIP INVITE request.

According to some aspects, memory 142 retains further instructions related to including an indication of an Idle mode Signaling reduction in a body or a header of error SIP response. In another aspect, memory 142 retains further instructions related to sending an indication of an Idle mode Signaling Reduction in a feature tag.

At least one processor 144 can be operatively connected to wireless communications apparatus 102 (and/or memory 142) to facilitate analysis of information related to fall back procedures in a communication network. Processor 144 can include a first module that receives an invitation to a session. Invitation is sent by a mobile device and comprises packet switched bearers for media. Processor 144 also includes a second module that rejects invitation and a third module that requests a network entity hold session. Also included in processor 144 can be a fourth module that establishes a circuit switched call to network entity and a fifth module that communicates with mobile device over session and the circuit switched call.

In accordance with some aspects, second module further sends an error message that includes an Idle mode Signaling Reduction indication in a body or a header of the error message. According to some aspects, second module further sends an indication of an Idle mode Signaling Reduction indication in a feature tag.

In accordance with some aspects, the following describes call control over Gm and fall back to CS executed by wireless communications apparatus 102, according to an aspect. When the ICS mobile device (e.g., wireless communications apparatus 102) receives a SIP INVITE request (e.g., SIP INVITE 120) and the ICS mobile device terminates a call that makes use of an IP bearer, if mobile device Terminating Access Domain Selection (T-ADS) (e.g., domain module 124) determines mobile device shall use CS origination, (and the ISR (as per TS 24.301) is active and if SRVCC procedures (as per TS 23.216) are used), ICS mobile device may send an error SIP response (e.g., error message 128) to the initial SIP INVITE request, including an SDP answer or a SIP header indicating that the current network relies on ISR.

The ICS mobile device shall send a CC SETUP message (e.g., CS call 134) in accordance with 3GPP TS 24.008[7] for 3GPP systems. Mobile device shall populate the CC SETUP message for 3GPP systems as follows: the called party BCD number information element set to the SCC AS PSI DN received in the SDP body of the SIP INVITE request.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In view of exemplary systems shown and described herein, methodologies that may be implemented in accordance with the disclosed subject matter, will be better appreciated with reference to various call flows or flow charts. While, for purposes of simplicity of explanation, some methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 2:
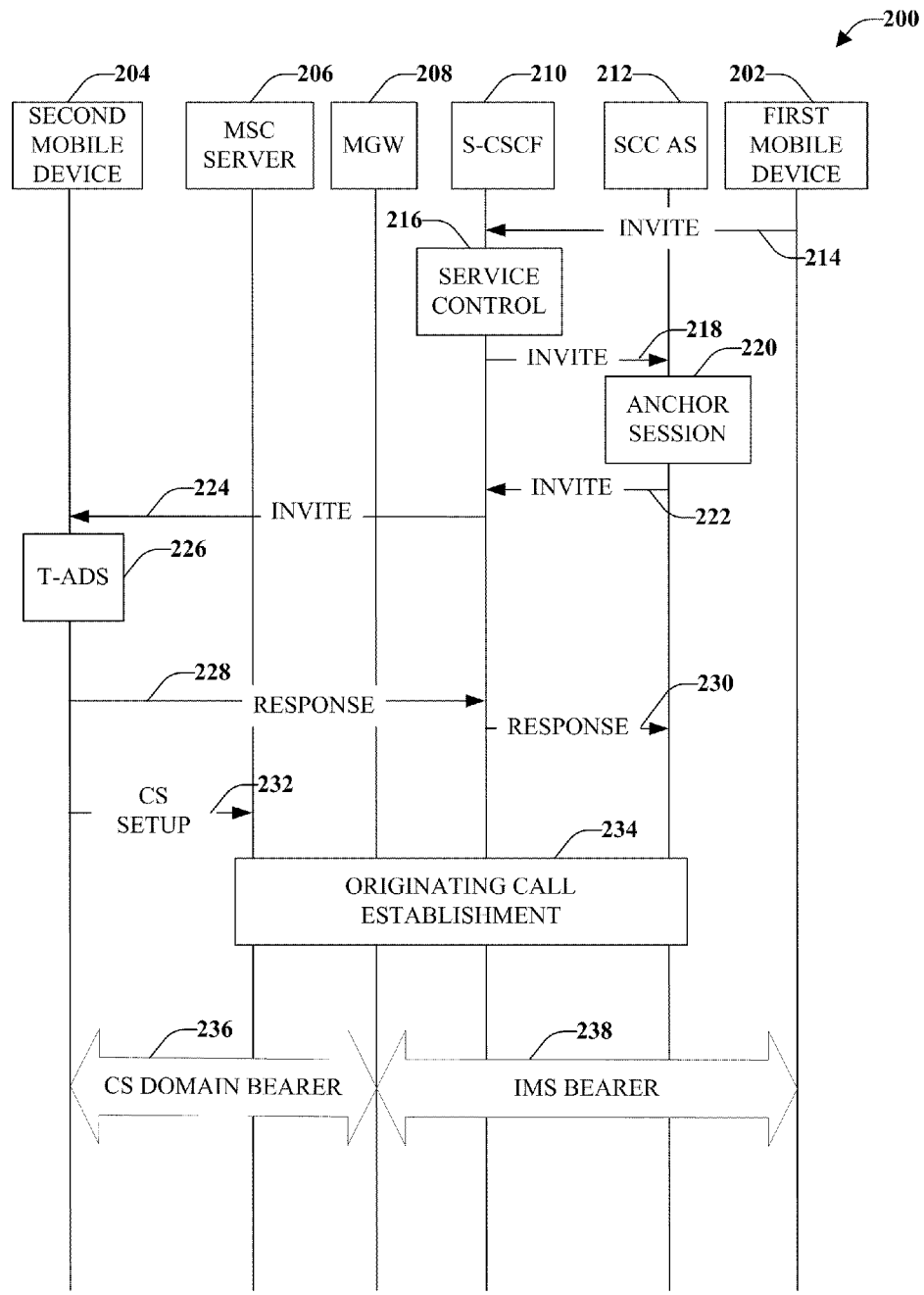
FIG. 2 illustrates a call flow for fall back using mobile device assisted terminating access domain selection, according to an aspect.

FIG. 2 illustrates a call flow 200 for fall back using mobile device assisted terminating access domain selection, according to an aspect. Represented by blocks are a first mobile device 202 and a second mobile device 204. Also represented are a Mobile Switching Center (MSC 206) server, a Media Gateway (MGW) 208, a Serving Call Session Control Function (S-CSCF 210), and a Service Centralization and Continuity Application Server (SCC AS 212).

Call flow 200 starts when first mobile device 202 sends an INVITE 214 for a session. INVITE 214 can be an SIP INVITE. S-CSCF 210 performs service control 216 and sends an INVITE 218 to SCC AS 212. SCC AS 212 anchors the session and performs terminating access domain selection (T-ADS 220). An invite 222, 224 is sent to second mobile device 204. Second mobile device 204 performs T-ADS 226 (e.g., domain selection) and sends a response 228, 230 to SCC AS 212. Response instructs SCC AS 212 to hold the session (associated with INVITE 214). A circuit switched (CS) call is set up (CS Setup 232) and there is originating call establishment 234. SCC AS 212 matches the held session and the incoming circuit switched call (associated with original INVITE 214) and connects the session with the circuit switched call, establishing CS Domain Bearer 236 and IMS Bearer 238.

Figure 3:
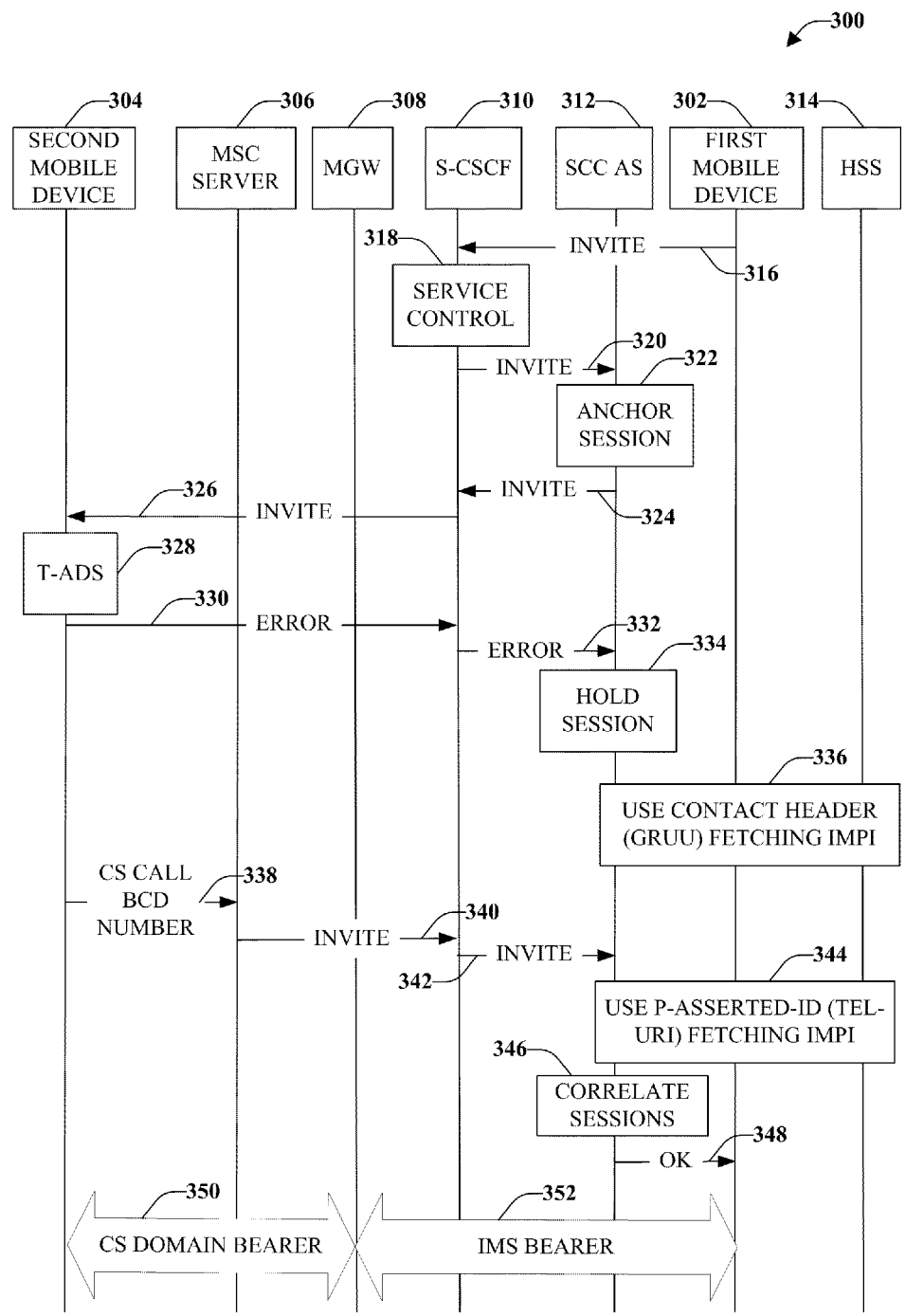
FIG. 3 illustrates a call flow for fall back using mobile device assisted terminating access domain selection, according to an aspect.

FIG. 3 illustrates a call flow 300 for fall back using mobile device assisted terminating access domain selection, according to an aspect. Represented by blocks are a first mobile device 302 and a second mobile device 304. Also represented are an MSC 306 server, a MGW 308, a S-CSCF 310, a SCC AS 312, and a Home Subscriber Server (HSS 314).

Call flow 300 starts when first mobile device 302 sends an INVITE 316 and S-CSCF 310 performs service control 318 and sends INVITE 320 to SCC AS 312. SCC AS 312 anchors the session and performs T-ADS 322. INVITE 324 is sent to S-CSCF and INVITE 326 is sent to second mobile device 304. Mobile Device T-ADS is performed 328 (e.g., domain is selected). Thus, in the above steps, SCC AS 312 sent a SIP invite to terminating mobile device (e.g., second mobile device 304) and terminating mobile device decided which domain should be used to terminate the call.

If INVITE 326 is for PS domain and second mobile device 304 selects CS domain, second mobile device 304 sends an error message 330, 332. In accordance with some aspects, the error message is sent with information indicating Idle mode Signaling Reduction (ISR). According to some aspects, SCC AS 312 receives the ISR information from registered feature tags. The error message can have an error code, such as "488", "380", or some other error code that indicates information associated with the rejection of the INVITE 326. The error code can be sent in a body or a header of error message. In accordance with some aspects, second mobile device 304 can send an error message that includes an Idle mode Signaling Reduction (ISR) indication. SCC AS 312 can obtain information for the registered Idle mode Signaling Reduction in a feature tag. If the Idle mode Signaling Reduction capabilities of second mobile device 304 change, the feature tag can be updated by second mobile device 304. SCC AS 312 places session on hold 334 while waiting for a circuit switched call setup by second mobile device 304.

SCC AS 312 can use GRUU in contact header to fetch the (Internet Protocol Multimedia Private Identity) IMPI 336.

Second mobile device 304 sets up the CS call by using the called party BCD information 338. Second mobile device 304 utilizes a preconfigured or a received number to dial the called party BCD number to establish the circuit switched call. For example, the BCD number can be included in the message sent by SCC AS 312. The BCD number can trigger network to set up an IMS session towards SCC AS 312.

MSC 306 sends an INVITE 340, 342 on behalf of second mobile device 304 by inserting Tel-URI in P-Asserted-ID. SCC AS uses the Tel-URI to fetch the IMPI via Sh reference point 344. SCC AS 312 correlates 346 the incoming call with the pending session and sets up a connection, if approved. For example, SCC AS 312 correlates the IMPI of the CS call with the IMPI of the held session. In accordance with some aspects, the correlation is based on a Mobile Subscriber Integrated Services Digital Network Number (MSISDN) inserted in P-Asserted-ID as a Tel-URI (Telephone Uniform Resource Identifier), by the GRUU inserted in the initial SIP INVITE after fetching the associated Internet Protocol Multimedia Private Identity (IMPI) from HSS (Home Subscriber Service) via Sh reference point. If there is a match, initial INVITE is approved 348 and CS Domain Bearer 350 and IMS Bearer 352 are established.

Figure 4:
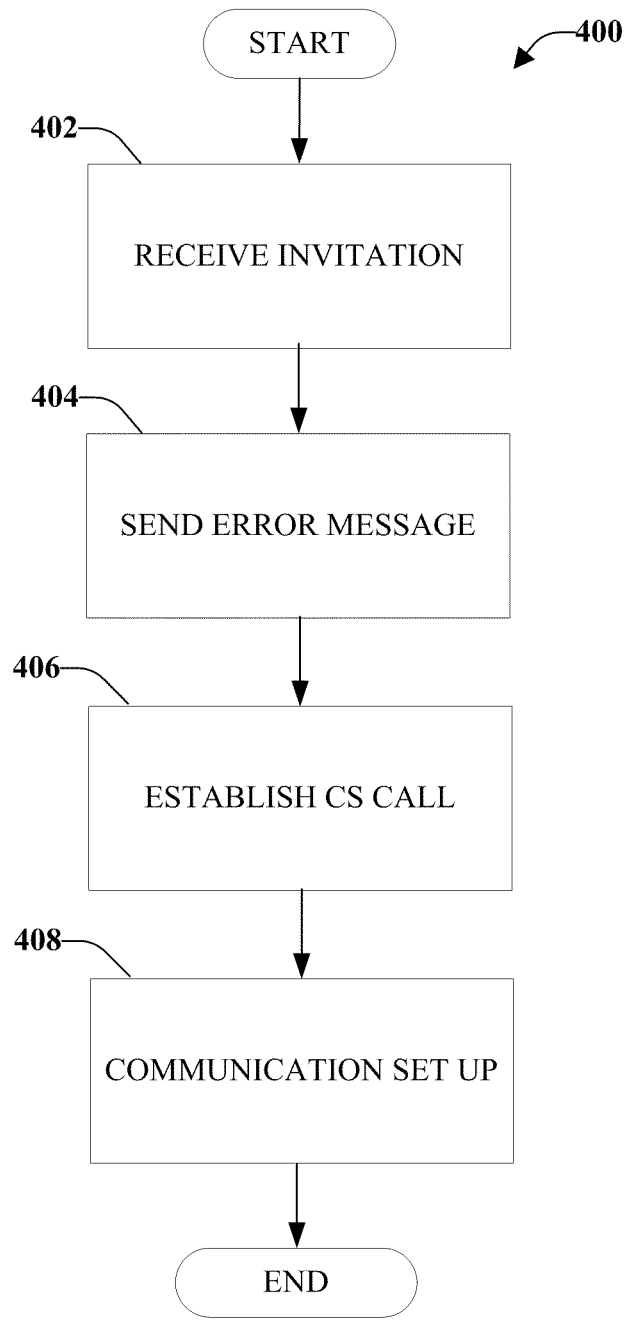
FIG. 4 illustrates a method for call control and fall back to circuit switched domain, according to an aspect.

FIG. 4 illustrates a method 400 for call control and fall back to circuit switched domain, according to an aspect. Method 400 can be performed by a mobile device. At 402, an invitation for a session is received. The invitation is received through a network entity and can be from an initiating device (e.g., a user of initiating device has initiated a communication to user of mobile device). The session can have PS bearers for the media. In accordance with some aspects, a Session Initiation Protocol INVITE request is received.

At 404, a rejection of the invitation is transmitted to network entity. The rejection can include a request for network entity to hold session. Rejection can include sending an error message and requesting session be held by network entity. According to some aspects, rejection can include sending an error message that includes an Idle mode Signaling Reduction indication. Idle mode Signaling Reduction indication can be included in a body or a header of the error message. According to some aspects, an indication of an Idle mode Signaling Reduction in sent in a feature tag.

A circuit switched call is established, at 406, and sent to network entity. CS communication is translated to IMS session while reaching network entity. Network entity correlates incoming session to held session. At 408, the session between initiating device and mobile device is set up and the devices (or the device users) can communicate.

In accordance with some aspects, a computer program product can include a computer-readable medium that comprises codes for carrying out various aspects of method 400. Computer-readable medium can include a first set of codes for causing a computer to receive an invitation for a session with packet switched bearers for media and a second set of codes for causing computer to reject invitation. Computer-readable medium also includes a third set of codes for causing computer to establish a circuit switched call toward a network entity and a fourth set of codes for causing computer to process a communication that is a correlation of session and circuit switched call.

In accordance with some aspects, computer-readable medium further comprises a fifth set of codes for causing computer to request network entity to hold session before third set of codes establishes the circuit switched call.

Figure 5:
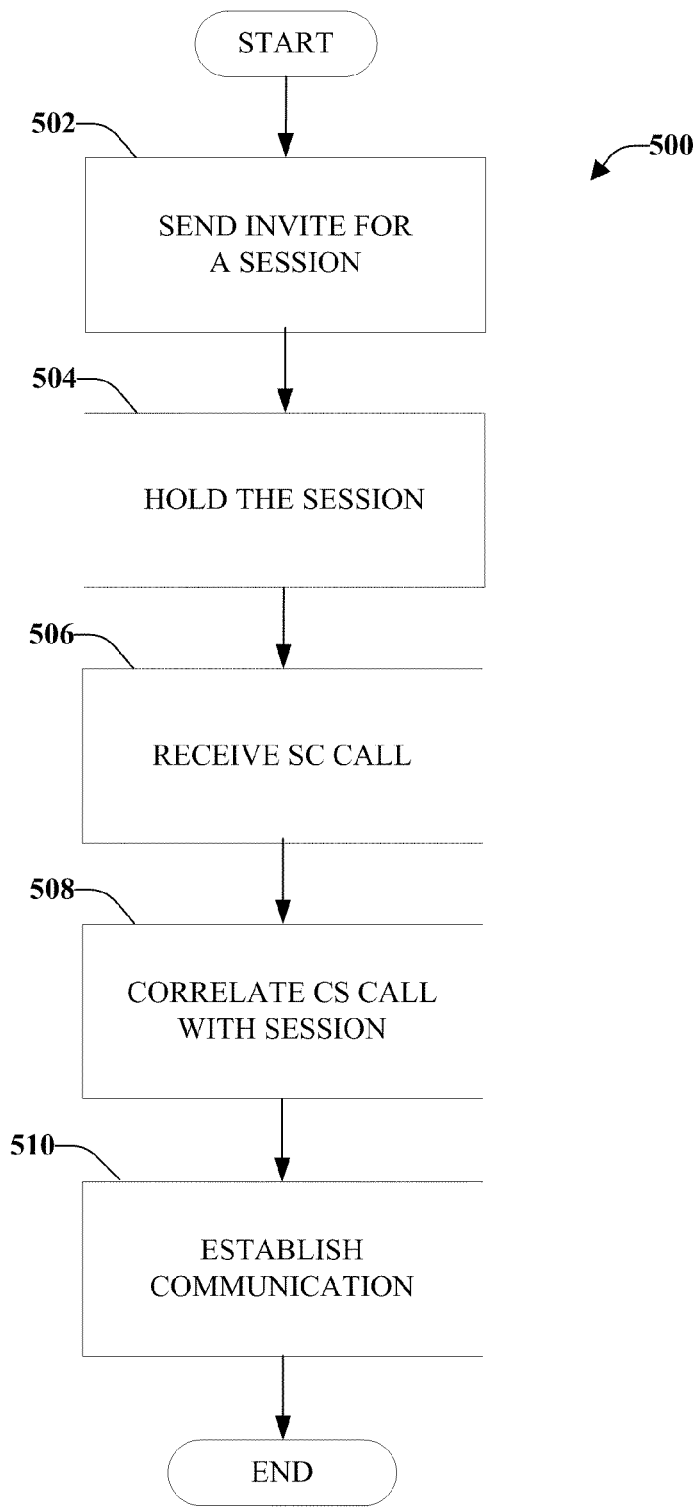
FIG. 5 illustrates a method for call termination as fall back over CS, according to an aspect.

FIG. 5 illustrates a method 500 for call termination as fall back over CS, according to an aspect. Method 500 can be performed by a network entity, such as a SCC AS. Method 500 starts, at 502, when an invitation to a session is forwarded to a mobile device. Invitation can be received from an originating device and can have packet switched bearers for media. At 504, session is held as a function of a rejection to invitation by mobile device. According to some aspects, session is held based on receiving from mobile device an error message that comprises an Idle mode Signaling Reduction indication. Idle mode Signaling Reduction indication can be received in a header or a body of error message. In accordance with some aspects, session is held based on receiving an indication of an Idle mode Signaling Reduction from a feature tag.

A circuit switched call is received from mobile device, at 506. Circuit switched call is correlated with session, at 508. In accordance with some aspects, circuit switched call is translated to an Internet Protocol Multimedia Subsystem session before correlation is performed. According to some aspects, correlation includes determining an Internet Protocol Multimedia Private Identity (IMPI) of the session matches the IMPI of the circuit switched call. If CS call matches session, at 510, communication is established between originating device and mobile device.

In accordance with some aspects, a computer program product can include a computer-readable medium that comprises codes for carrying out various aspects of method 500. Computer-readable medium can include a first set of codes for causing a computer to forward an initial INVITE towards a first node over a Gm reference point using packet switched media. Also included is a second set of codes for causing computer to create a first Session Initiation Protocol (SIP INVITE) request with a Protocol Specific Identification of Destination Network (PSI DN) in a Session Description Protocol (SDP) body. Computer-readable medium also includes a third set of codes for causing computer to route the SIP INVITE to first node and a fourth set of codes for causing computer to receive from first node an error SIP response that indicates a network relies on Idle mode Signaling Reduction (ISR). Further, computer-readable medium includes a fifth set of codes for causing computer to hold a session associated with the initial INVITE and a sixth set of codes for causing computer to fetch an Internet Protocol Multimedia Private Identity (IMPI) associated to a GRUU inserted in a contact header of a SIP response. Also included are a seventh set of codes for receiving a second SIP INVITE request from a CS domain and an eighth set of codes for causing the computer to fetch the IMPI associated with the SIP INVITE. Computer-readable medium also includes a ninth set of codes for causing computer to establish the session toward a second node if the IMPI associated with the first SIP INVITE matches the IMPI associated with the second SIP INVITE.

In accordance with some aspects, computer-readable medium further comprises a tenth set of codes for causing computer to ascertain that a Request Universal Resource Identifier (URI) in the second SIP INVITE is set to a valid PSI DN before the seventh set of codes fetches the IMPI.

According to some aspects, computer-readable medium further comprises a tenth set of codes for causing computer to fetch the IMPI associated with the SIP invite from Home Subscriber Server (HSS) via Sh reference point if a value of a P-Asserted-ID is generated by a Mobile Subscriber Integrated Services Digital Network Number (C-MSISDN) of the first node.

Figure 6:
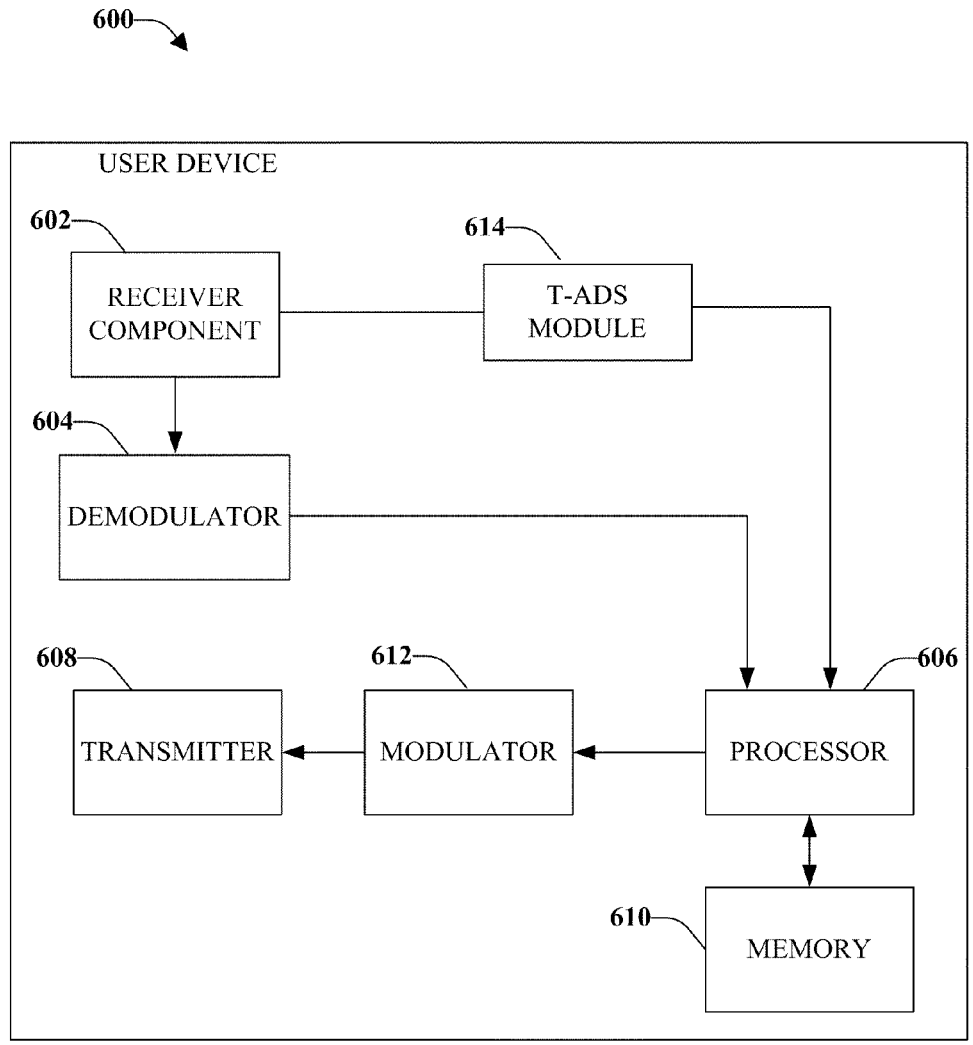
FIG. 6 illustrates a system that facilitates fall back using mobile device assisted terminating access domain selection in accordance with one or more of the disclosed aspects.

With reference now to FIG. 6, illustrated is a system 600 that facilitates fall back using mobile device assisted terminating access domain selection in accordance with one or more of the disclosed aspects. System 600 can reside in a user device. System 600 comprises a receiver component 602 that can receive a signal from, for example, a receiver antenna. Receiver component 602 can perform typical actions thereon, such as filtering, amplifying, downconverting, etc. the received signal. Receiver component 602 can also digitize the conditioned signal to obtain samples. A demodulator 604 can obtain received symbols for each symbol period, as well as provide received symbols to a processor 606.

Processor 606 can be a processor dedicated to analyzing information received by receiver component 602 and/or generating information for transmission by a transmitter 608. In addition or alternatively, processor 606 can control one or more components of system 600, analyze information received by receiver component 602, generate information for transmission by transmitter 608, and/or control one or more components of system 600. Processor 606 may include a controller component capable of coordinating communications with additional user devices.

System 600 can additionally comprise memory 610 operatively coupled to processor 606. Memory 610 can store information related to coordinating communications and any other suitable information. Memory 610 can additionally store protocols associated with fall back procedures. Memory 610 of the various aspects is intended to comprise, without being limited to, these and any other suitable types of memory. System 600 can further comprise a symbol modulator 612, wherein transmitter 608 transmits the modulated signal.

Receiver component 602 is further operatively coupled to a T-ADS module 614 that is configured to select a domain that should be utilized for a communication. T-ADS module 614 is also configured to request a network entity hold an incoming communication that utilizes a different domain than selected domain. For example, if the incoming communication is over PS domain and T-ADS module 614 determines CS domain should be utilized, a rejection is communicated to network entity. A communication over the selected domain (e.g., CS domain) is initiated. If network entity maps incoming communication with initiated communication, network entity correlates the held communication and the initiated communication.

Figure 7:
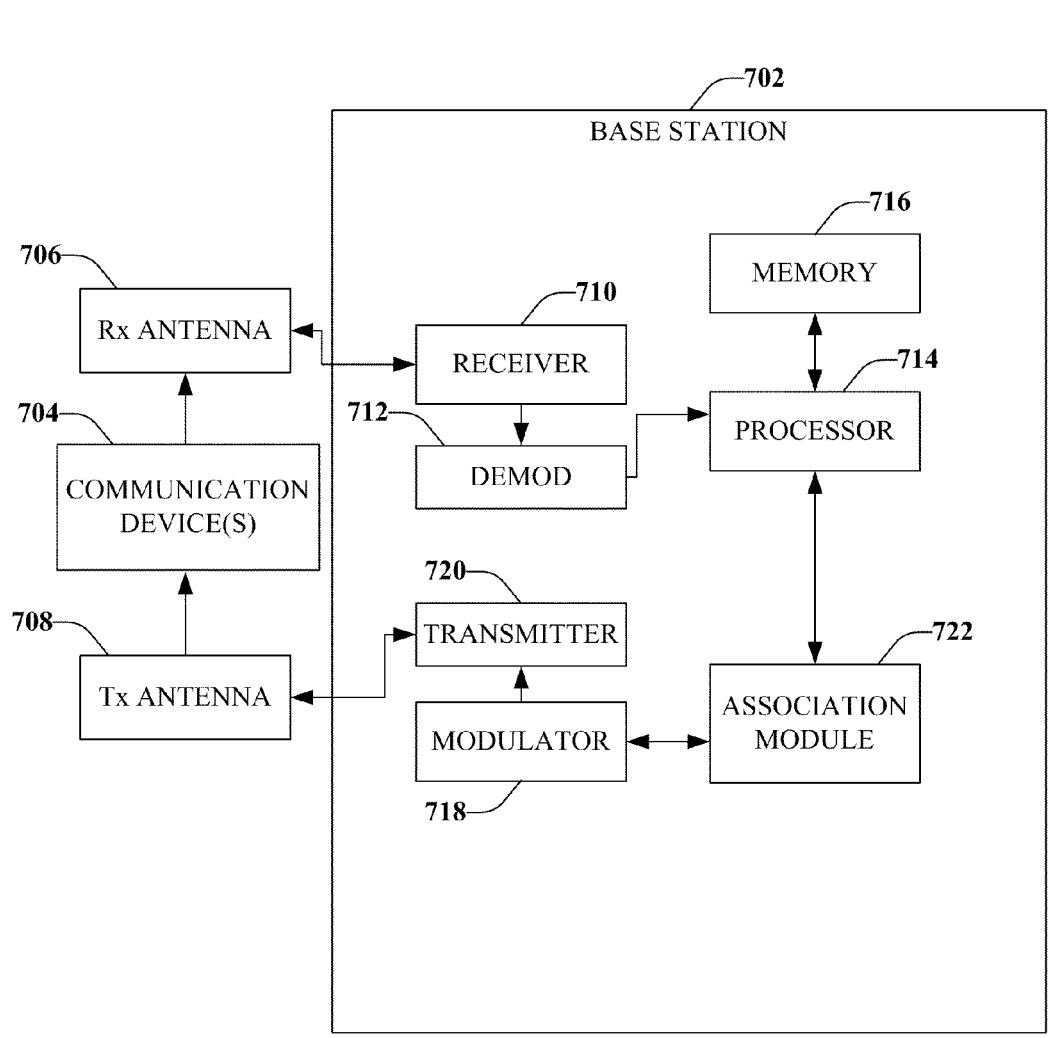
FIG. 7 is an illustration of a system that facilitates fall back procedures in a communications environment in accordance with various aspects presented herein.

FIG. 7 is an illustration of a system 700 that facilitates fall back procedures in a communications environment in accordance with various aspects presented herein. System 700 comprises an access point or base station 702. As illustrated, base station 702 receives signal(s) from one or more communication devices 704 (e.g., user device) by a receive antenna 706, and transmits to the one or more communication devices 704 through a transmit antenna 708.

Base station 702 comprises a receiver 710 that receives information from receive antenna 706 and is operatively associated with a demodulator 712 that demodulates received information. Demodulated symbols are analyzed by a processor 714 that is coupled to a memory 716 that stores information related to broadcast-fall back procedures. A modulator 718 can multiplex the signal for transmission by a transmitter 720 through transmit antenna 708 to communication devices 704.

Processor 714 is further coupled to an association module 722 that is configured to determine whether a held communication (e.g., over PS domain) matches an initiated communication (e.g., CS domain). If there is a match, a dialog is set up between an originating device and a terminating device over circuit switched domain bearers and IMS bearers.

Figure 8:
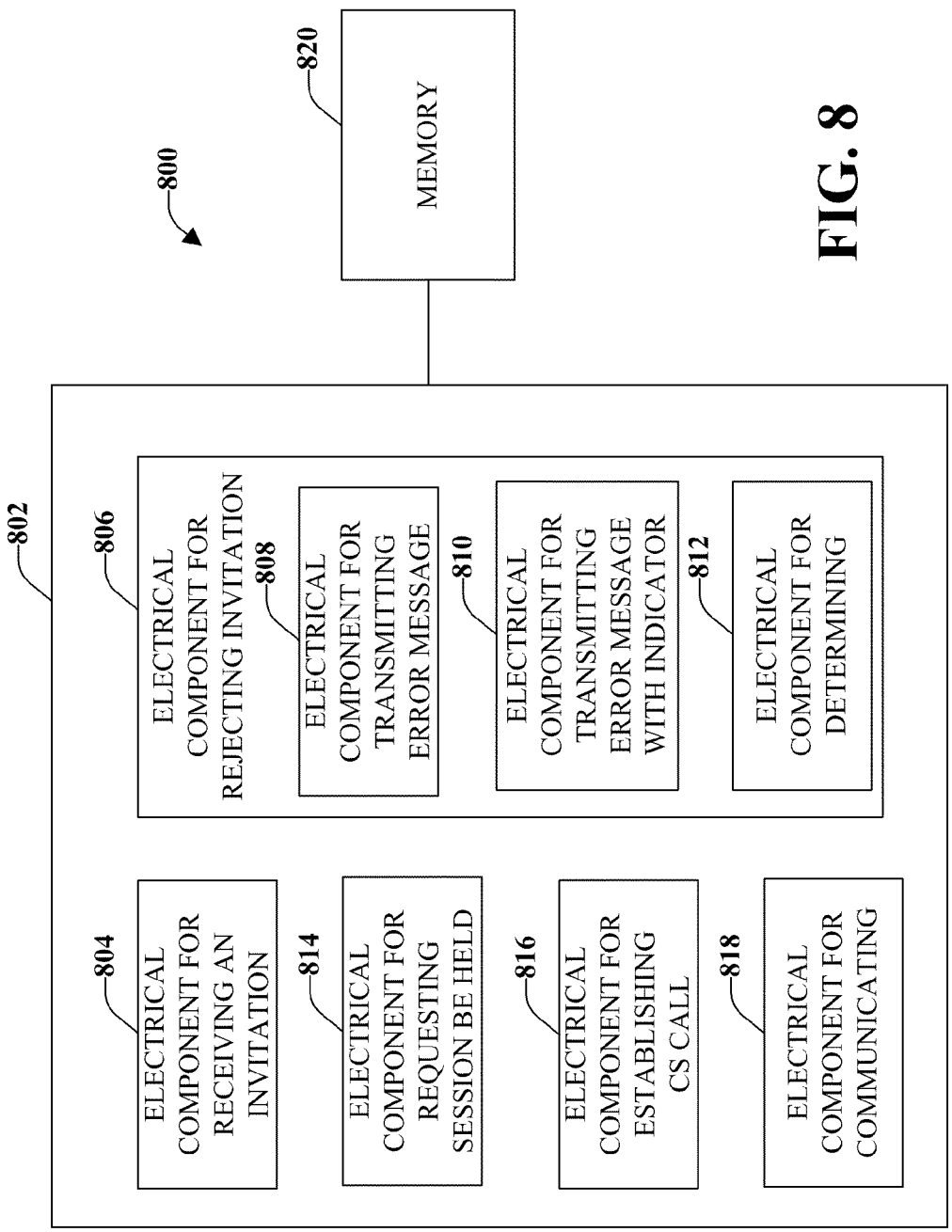
FIG. 8 illustrates an example system that utilizes mobile device assisted terminating access domain selection for fall back, in accordance with an aspect.

With reference to FIG. 8, illustrated is an example system 800 that utilizes mobile device assisted terminating access domain selection for fall back, in accordance with an aspect. System 800 may reside at least partially within a mobile device. It is to be appreciated that system 800 is represented as including functional blocks, which may be functional blocks that represent functions implemented by a processor, software, or combination thereof (e.g., firmware).

System 800 includes a logical grouping 802 of electrical components that can act separately or in conjunction. Logical grouping 802 may include an electrical component 804 for receiving an invitation to a session. Invitation is sent by a mobile device and comprises packet switched bearers for media.

Logical grouping 802 also includes an electrical component 806 for rejecting invitation. In accordance with some aspects, electrical component 806 includes an electrical component 808 for transmitting an error message to network entity. According to some aspects, electrical component 806 includes an electrical component 810 for transmitting an error message that includes an Idle mode Signaling Reduction indicator in a header or a body of the error message. According to some aspects, electrical component 806 includes an electrical component 812 for determining a current network relies on Idle mode Signaling Reduction (ISR).

Also included in logical grouping 802 is an electrical component 814 for requesting a network entity hold session and an electrical component 816 for establishing a circuit switched call to network entity. Also included is an electrical component 818 for communicating with mobile device over session and circuit switched call.

Additionally, system 800 can include a memory 820 that retains instructions for executing functions associated with electrical components 804-818 or other components. While shown as being external to memory 820, it is to be understood that one or more of electrical components 804-818 may exist within memory 820.

Figure 9:
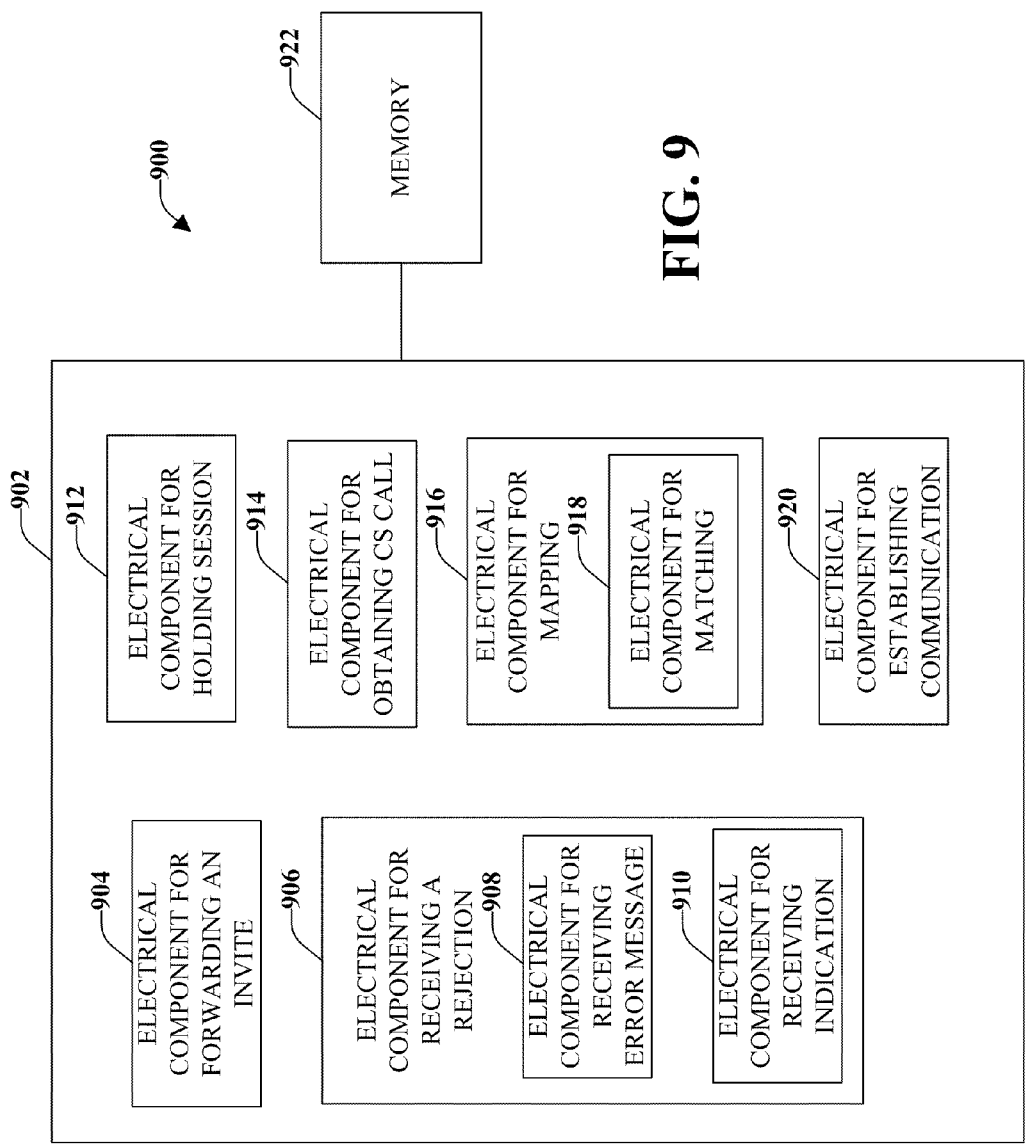
FIG. 9 illustrates an example system that facilitates fall back procedures in a communication environment based on mobile device assisted terminating access domain selection, according to an aspect.

With reference to FIG. 9, illustrated is an example system 900 that facilitates fall back procedures in a communication environment based on mobile device assisted terminating access domain selection, according to an aspect. System 900 may reside at least partially within a network entity. System 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 includes an electrical component 904 for forwarding to a first mobile device an invitation for a session. Invitation is from a second mobile device and has packet switched bearers for media. Also included is an electrical component 906 for receiving a rejection to invitation. In accordance with some aspects, electrical component 906 includes an electrical component 908 for receiving an error message that comprises an Idle mode Signaling Reduction indication in a header or a body of error message. According to some aspects, electrical component 906 includes an electrical component 910 for receiving an indication of an Idle mode Signaling Reduction from a feature tag.

Logical grouping 902 also includes an electrical component 912 for temporarily holding session as a function of rejection to invitation by first mobile device. Also included are an electrical component 914 for obtaining a circuit switched call from first mobile device and an electrical component 916 for mapping circuit switched call to session. In accordance with some aspects, electrical component 916 includes an electrical component 918 for determining there is a match between an Internet Protocol Multimedia Private Identity of session and circuit switched call. Logical grouping 902 also includes an electrical component 920 for establishing a communication between the first mobile device and the second mobile device.

Additionally, system 900 can include a memory 922 that retains instructions for executing functions associated with electrical components 904-920 or other components. While shown as being external to memory 922, it is to be understood that one or more of electrical components 904-920 may exist within memory 922.

Figure 10:
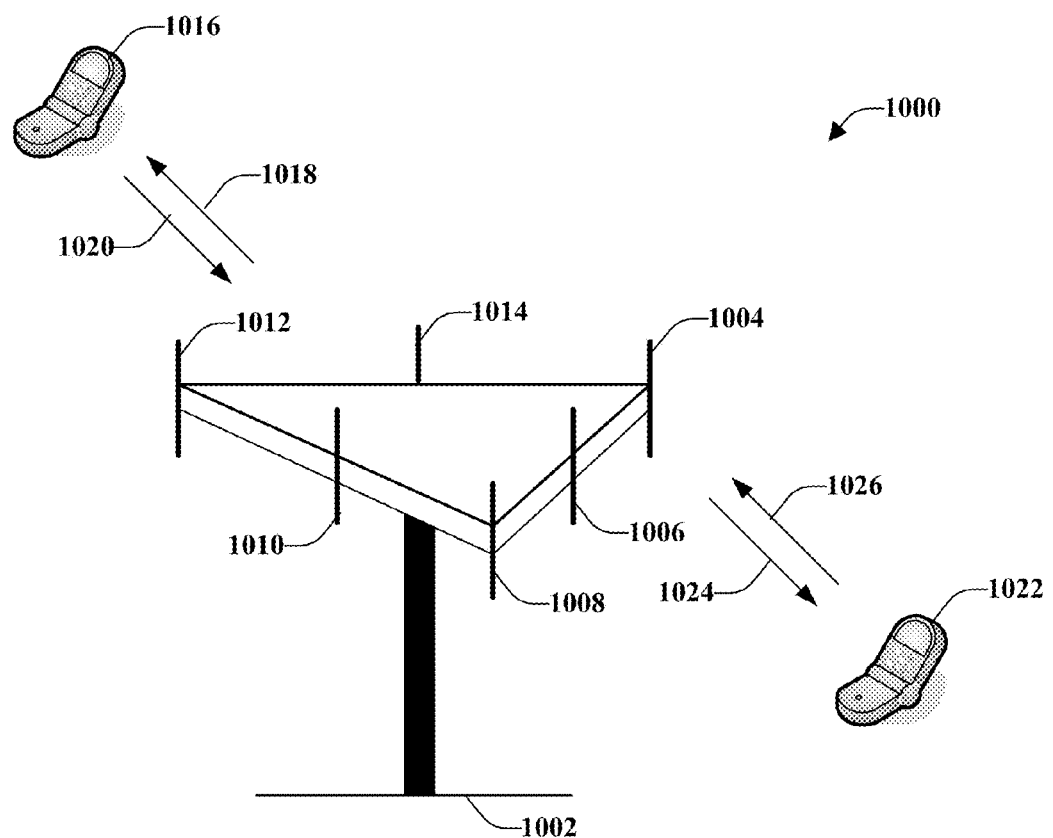
FIG. 10 illustrates a multiple access wireless communication system according to one or more aspects.

Referring now to FIG. 10, a multiple access wireless communication system 1000 according to one or more aspects is illustrated. A wireless communication system 1000 can include one or more base stations in contact with one or more user devices. Each base station provides coverage for a plurality of sectors. A three-sector base station 1002 is illustrated that includes multiple antenna groups, one including antennas 1004 and 1006, another including antennas 1008 and 1010, and a third including antennas 1012 and 1014. According to the figure, only two antennas are shown for each antenna group, however, more or fewer antennas may be utilized for each antenna group. Mobile device 1016 is in communication with antennas 1012 and 1014, where antennas 1012 and 1014 transmit information to mobile device 1016 over forward link 1018 and receive information from mobile device 1016 over reverse link 1020. Forward link (or downlink) refers to communication link from base stations to mobile devices, and reverse link (or uplink) refers to communication link from mobile devices to base stations. Mobile device 1022 is in communication with antennas 1004 and 1006, where antennas 1004 and 1006 transmit information to mobile device 1022 over forward link 1024 and receive information from mobile device 1022 over reverse link 1026. In a FDD system, for example, communication links 1018, 1020, 1024, and 1026 might utilize different frequencies for communication. For example, forward link 1018 might use a different frequency than the frequency utilized by reverse link 1020.

Each group of antennas and/or the area in which they are designated to communicate may be referred to as a sector of base station 1002. In one or more aspects, antenna groups each are designed to communicate to mobile devices in a sector or the areas covered by base station 1002. A base station may be a fixed station used for communicating with mobile devices.

In communication over forward links 1018 and 1024, transmitting antennas of base station 1002 can utilize beamforming in order to improve a signal-to-noise ratio of forward links for different mobile devices 1016 and 1022. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 11:
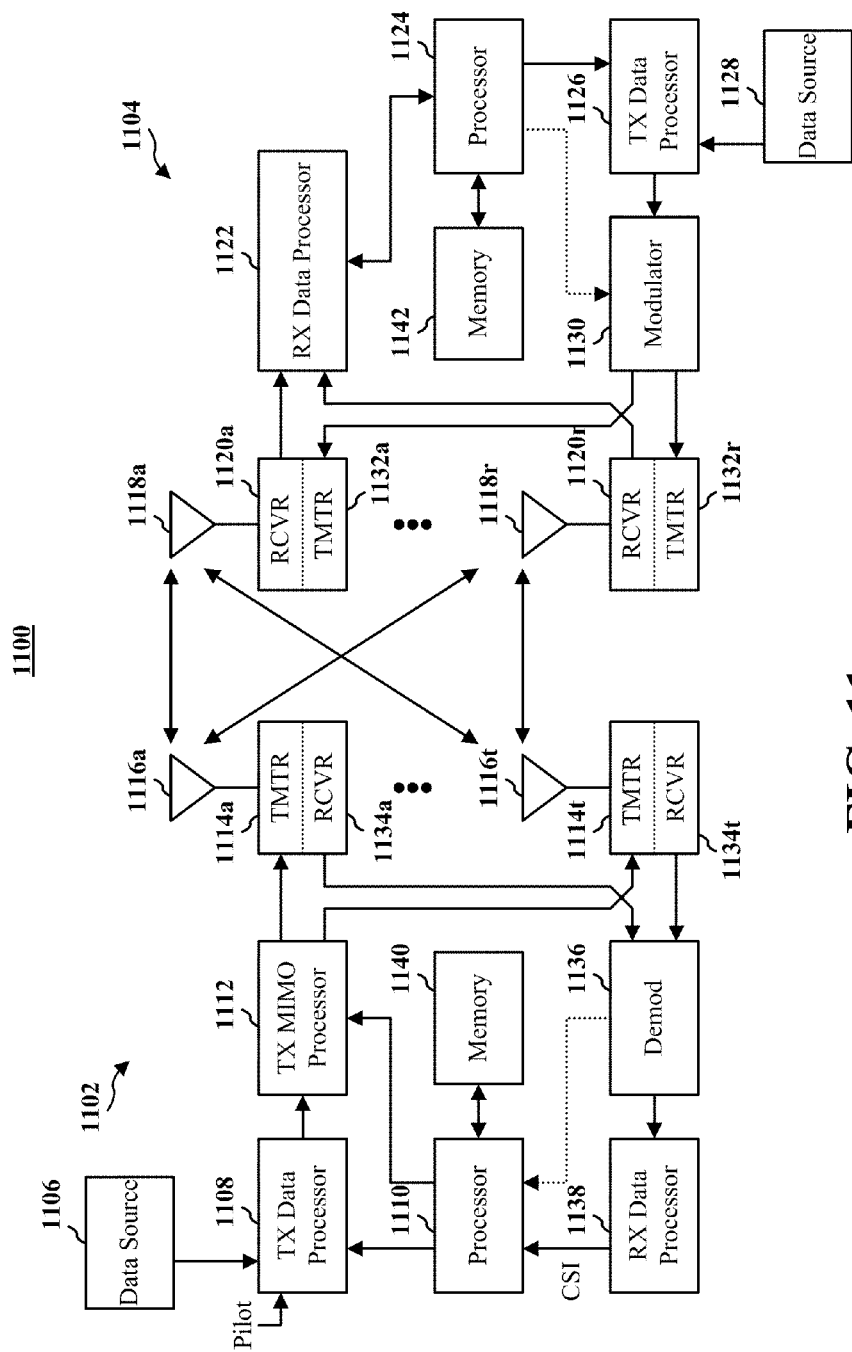
FIG. 11 illustrates an example wireless communication system, according to an aspect.

FIG. 11 illustrates an example wireless communication system 1100. The wireless communication system 1100 depicts one base station 1102 and one mobile device 1104 for sake of brevity. However, it is to be appreciated that system 1100 can include more than one base station and/or more than one mobile device, wherein additional base stations and/or mobile devices can be substantially similar or different from example base station 1102 and mobile device 1104 described below. In addition, it is to be appreciated that base station 1102 and/or mobile device 1104 can employ the systems and/or methods described herein to facilitate wireless communication there between.

At base station 1102, traffic data for a number of data streams is provided from a data source 1106 to a transmit (TX) data processor 1108. According to an example, each data stream can be transmitted over a respective antenna. TX data processor 1108 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1104 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1110.

The modulation symbols for the data streams can be provided to a TX MIMO processor 1112, which can further process the modulation symbols (e.g., for OFDM). TX MIMO processor 1112 then provides $N_T$ modulation symbol streams to $N_T$ transmitters (TMTR) 1114a through 1114t. In various embodiments, TX MIMO processor 1112 applies beamforming weights to the symbols of the data streams and to the antenna from which the symbol is being transmitted.

Each transmitter 1114 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1114a through 1114t are transmitted from $N_T$ antennas 1116a through 1116t, respectively.

At mobile device 1104, the transmitted modulated signals are received by $N_R$ antennas 1118a through 1118r and the received signal from each antenna 1118 is provided to a respective receiver (RCVR) 1120a through 1120r. Each receiver 1120 conditions (e.g., filters, amplifies, and downconverts) a respective signal, digitizes the conditioned signal to provide samples, and further processes the samples to provide a corresponding "received" symbol stream.

An RX data processor 1122 can receive and process the $N_R$ received symbol streams from $N_R$ receivers 1120 based on a particular receiver processing technique to provide $N_T$ "detected" symbol streams. RX data processor 1122 can demodulate, deinterleave, and decode each detected symbol stream to recover the traffic data for the data stream. The processing by RX data processor 1122 is complementary to that performed by TX MIMO processor 1112 and TX data processor 1108 at base station 1102.

A processor 1124 can periodically determine which precoding matrix to utilize as discussed above. Further, processor 1124 can formulate a reverse link message comprising a matrix index portion and a rank value portion.

The reverse link message can comprise various types of information regarding the communication link and/or the received data stream. The reverse link message can be processed by a TX data processor 1126, which also receives traffic data for a number of data streams from a data source 1128, modulated by a modulator 1130, conditioned by transmitters 1132a through 1132r, and transmitted back to base station 1102.

At base station 1102, the modulated signals from mobile device 1104 are received by antennas 1116, conditioned by receivers 1134a though 1134t, demodulated by a demodulator 1136, and processed by a RX data processor 1138 to extract the reverse link message transmitted by mobile device 1104. Further, processor 1110 can process the extracted message to determine which precoding matrix to use for determining the beamforming weights.

Processors 1110 and 1124 can direct (e.g., control, coordinate, manage, etc.) operation at base station 1102 and mobile device 1104, respectively. Respective processors 1110 and 1124 can be associated with memory 1140 and 1142 that store program codes and data. Processors 1110 and 1124 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features are presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method for fall back procedures in a communications environment, comprising:
    forwarding to a first mobile device an invitation for a session, the invitation is from a second mobile device and has packet switched bearers for media;
    holding the session as a function of a rejection to the invitation by the first mobile device based on a received Idle mode Signaling Reduction indication;
    receiving a circuit switched call from the first mobile device;
    correlating the circuit switched call with the session; and
    establishing a communication between the first mobile device and the second mobile device over circuit switched domain bearers and Internet Protocol Multimedia Subsystem (IMS) bearers.

2. The method of claim 1, further comprising translating the circuit switched call to an Internet Protocol Multimedia Subsystem session before the correlating.

3. The method of claim 1, wherein the holding comprises receiving from the first mobile device an error message that comprises the Idle mode Signaling Reduction indication.

4. The method of claim 3, wherein the receiving comprises receiving the Idle mode Signaling Reduction indication in a header or a body of the error message.

5. The method of claim 1, wherein the holding comprises receiving an indication of the Idle mode Signaling Reduction from a feature tag.

6. The method of claim 1, wherein the correlating further comprises determining an Internet Protocol Multimedia Private Identity (IMPI) of the session is a match to an IMPI of the circuit switched call.

7. A wireless communications apparatus, comprising:
    a memory that retains instructions related to sending to a first node an invitation for a session received by a second node, holding the session as a function of a rejection of the session by the first node based on a received Idle mode Signaling Reduction indication, detecting a circuit switched call from the first node, mapping the circuit switched call to the session, and setting up a dialog between the first node and the second node over circuit switched domain bearers and Internet Protocol Multimedia Subsystem (IMS) bearers; and
    a processor, coupled to the memory, configured to execute the instructions retained in the memory.

8. The wireless communications apparatus of claim 7, wherein the memory retains further instructions related to translating the circuit switched call to an Internet Protocol Multimedia Subsystem session before the mapping.

9. The wireless communications apparatus of claim 7, wherein the memory retains further instructions related to holding the session as a function of an error message received from the first node, the error message comprises the Idle mode Signaling Reduction indication.

10. The wireless communications apparatus of claim 9, wherein the Idle mode signaling Reduction indication is in a body or a header of the error message.

11. The wireless communications apparatus of claim 7, wherein the memory retains further instructions related to holding the session based on the Idle mode Signaling Reduction indication received in a feature tag.

12. The wireless communications apparatus of claim 7, wherein the memory retains further instructions related to determining there is a match between an Internet Protocol Multimedia Private Identity of the session and the circuit switched call.

13. A wireless communications apparatus that performs fall back procedures, comprising:
 means for forwarding to a first mobile device an invitation for a session, the invitation is from a second mobile device and has packet switched bearers for media;
 means for receiving a rejection to the invitation;
 means for temporarily holding the session as a function of the rejection to the invitation by the first mobile device based on a received Idle mode Signaling Reduction indication;
 means for obtaining a circuit switched call from the first mobile device;
 means for mapping the circuit switched call to the session; and
 means for establishing a communication between the first mobile device and the second mobile device.

14. The wireless communications apparatus of claim 13, wherein the means for receiving further comprising means for receiving an error message that comprises an Idle mode Signaling Reduction indication in a header or a body of the error message.

15. The wireless communications apparatus of claim 13, wherein the means for receiving further comprising means for receiving an indication of the Idle mode Signaling Reduction from a feature tag.

16. The wireless communications apparatus of claim 13, wherein the means for mapping further comprising means for determining there is a match between an Internet Protocol Multimedia Private Identity of the session and the circuit switched call.

17. A computer program product, comprising:
 a non-transitory computer-readable medium comprising:
  a first set of codes for causing a computer to forward an initial INVITE towards a first node over a Gm reference point using packet switched media;
  a second set of codes for causing the computer to create a first Session Initiation Protocol (SIP INVITE) request with a Protocol Specific Identification of Destination Network (PSI DN) in a Session Description Protocol (SDP) body;
  a third set of codes for causing the computer to route the first SIP INVITE to the first node;
  a fourth set of codes for causing the computer to receive from the first node an error SIP response that indicates a network relies on Idle mode Signaling Reduction (ISR);
  a fifth set of codes for causing the computer to hold a session associated with the initial INVITE;
  a sixth set of codes for causing the computer to fetch an Internet Protocol Multimedia Private Identity (IMPI) associated to a Globally Routable User Agent URI (GRUU) inserted in a contact header of a SIP response;
  a seventh set of codes for causing the computer to receive a second SIP INVITE request from a circuit-switched (CS) domain;
  an eighth set of codes for causing the computer to fetch the IMPI associated with the second SIP INVITE; and
  a ninth set of codes for causing the computer to establish the session toward a second node if the IMPI associated with the first SIP INVITE matches the IMPI associated with the second SIP INVITE.

18. The computer program product of claim 17, the computer-readable medium further comprising a tenth set of codes for causing the computer to ascertain that a Request Universal Resource Identifier (URI) in the second SIP INVITE is set to a valid PSI DN before the seventh set of codes fetches the IMPI.

19. The computer program product of claim 17, the computer-readable medium further comprising a tenth set of codes for causing the computer to fetch the IMPI associated with the SIP invite from Home Subscriber Server (HSS) via Sh reference point if a value of a P-Asserted-ID is generated by a Mobile Subscriber Integrated Services Digital Network Number (C-MSISDN) of the first node.

20. At least one processor configured to perform call termination as a fall back over circuit switched domain, comprising:
 a first module that sends to a first node an invitation for a session received by a second node;
 a second module that holds the session as a function of a rejection of the session by the first node based on a received Idle mode Signaling Reduction indication;
 a third module that detects a circuit switched call from the first node;
 a fourth module that maps the circuit switched call to the session; and
 a fifth module that sets up a dialog between the first node and the second node over circuit switched domain bearers and Internet Protocol Multimedia Subsystem (IMS) bearers.

21. The at least one processor of claim 20, wherein the second module receives the rejection that includes an error message that comprises the Idle mode Signaling Reduction indication in a header or a body of the error message.

22. A method for fall back using mobile device assisted terminating access domain selection, comprising:
 receiving an invitation for a session with packet switched bearers for media;
 rejecting the invitation by sending an Idle mode Signaling Reduction indication;
 establishing a circuit switched call toward a network entity; and
 terminating an incoming communication that is a correlation of the session and the circuit switched call.

23. The method of claim 22, wherein the rejecting comprises sending an error message and requesting the session be held by the network entity.

24. The method of claim 22, wherein the sending comprises sending the Idle mode Signaling Reduction indication in a body or a header of the error message.

25. The method of claim 22, wherein the rejecting comprises sending an indication of an Idle mode Signaling Reduction in a feature tag.

26. The method of claim 22, wherein the receiving comprises receiving a Session Initiation Protocol INVITE request.

27. A wireless communications apparatus, comprising:
 a memory that retains instructions related to receiving a Session Initiation Protocol (SIP) INVITE request, deciding to use circuit switched origination, terminating a call using an Internet Protocol bearer, rejecting the SIP INVITE by sending an Idle mode Signaling Reduction indication, and sending a circuit call SETUP message; and
 a processor, coupled to the memory, configured to execute the instructions retained in the memory.

28. The wireless communications apparatus of claim 27, wherein the memory retains further instructions related to populating a CC SETUP message with a called party Binary Coded Decimal (BCD) number element set to a Protocol Specific Identification of Destination Network (PSI DN) received in a Session Description Protocol (SDP) body of the SIP INVITE request.

29. The wireless communications apparatus of claim 27, wherein the Idle mode Signaling reduction is in a body or a header of an error SIP response.

30. The wireless communications apparatus of claim 27, wherein the Idle mode Signaling Reduction is in a feature tag.

31. A wireless communications apparatus that utilizes fall back procedures, comprising:
   means for receiving an invitation to a session, the invitation is sent by a mobile device and comprises packet switched bearers for media;
   means for rejecting the invitation by transmitting an Idle mode Signaling Reduction indicator;
   means for requesting a network entity to hold the session;
   means for establishing a circuit switched call to the network entity; and
   means for communicating with the mobile device over the session and the circuit switched call.

32. The wireless communications apparatus of claim 31, wherein the means for rejecting further comprising means for transmitting an error message to the network entity.

33. The wireless communications apparatus of claim 31, wherein the Idle mode Signaling Reduction indicator is in a header or a body of the error message.

34. The wireless communications apparatus of claim 31, wherein the means for rejecting further comprising means for determining a current network relies on Idle mode Signaling Reduction (ISR).

35. A computer program product, comprising:
   a non-transitory computer-readable medium comprising:
      a first set of codes for causing a computer to receive an invitation for a session with packet switched bearers for media;
      a second set of codes for causing the computer to reject the invitation by sending an Idle mode Signaling Reduction indication;
      a third set of codes for causing the computer to establish a circuit switched call toward a network entity; and
      a fourth set of codes for causing the computer to process a communication that is a correlation of the session and the circuit switched call.

36. The computer program product of claim 35, the computer-readable medium further comprising a fifth set of codes for causing the computer to request the network entity to hold the session before the third set of codes establishes the circuit switched call.

37. At least one processor configured to facilitate fall back procedures comprising:
   a first module that receives an invitation to a session, the invitation is sent by a mobile device and comprises packet switched bearers for media;
   a second module that rejects the invitation by sending an Idle mode Signaling Reduction indication;
   a third module that requests a network entity to hold the session;
   a fourth module that establishes a circuit switched call to the network entity; and
   a fifth module that communicates with the mobile device over the session and the circuit switched call.

38. The at least one processor of claim 37, wherein the Idle mode Signaling Reduction indication is in a body or a header of the error message.

39. The at least one processor of claim 37, wherein the Idle mode Signaling Reduction indication is in a feature tag.

* * * * *